(12) United States Patent
Godoy

(10) Patent No.: US 11,818,331 B2
(45) Date of Patent: Nov. 14, 2023

(54) DISPLAY HEADSET

(71) Applicant: LENOVO (SINGAPORE) PTE. LTD, Singapore (SG)

(72) Inventor: Gustavo Godoy, Sumaré (BR)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/530,831

(22) Filed: Nov. 19, 2021

(65) Prior Publication Data

US 2023/0164303 A1    May 25, 2023

(51) Int. Cl.
```
H04N 13/332    (2018.01)
H04N 13/122    (2018.01)
G02B 27/00     (2006.01)
```

(52) U.S. Cl.
CPC ........ *H04N 13/332* (2018.05); *H04N 13/122* (2018.05); *G02B 27/0081* (2013.01)

(58) Field of Classification Search
CPC . H04N 13/332; H04N 13/122; G02B 27/0081
See application file for complete search history.

(56) References Cited

U.S. PATENT DOCUMENTS

| | | | | |
|---|---|---|---|---|
| 4,197,527 A * | 4/1980 | Romney | ................. | G09F 13/32 340/815.53 |
| 5,765,235 A * | 6/1998 | Arnold | ..................... | A42B 3/24 2/435 |
| 7,746,293 B2 * | 6/2010 | Kobayashi | ................ | G09F 9/33 345/204 |
| 8,547,295 B2 * | 10/2013 | Vidal | ................... | G02B 27/024 345/1.3 |
| 11,067,802 B1 * | 7/2021 | Harrison | ............ | G02B 27/0172 |
| 2003/0070200 A1 * | 4/2003 | Crye | ........................ | A42B 3/10 2/6.6 |
| 2004/0113543 A1 * | 6/2004 | Daniels | ............... | H01L 27/3209 257/E27.15 |
| 2004/0239890 A1 * | 12/2004 | Starkweather | ......... | G03B 21/62 353/69 |
| 2005/0052348 A1 * | 3/2005 | Yamazaki | ........... | B60W 30/095 345/44 |
| 2007/0175231 A1 * | 8/2007 | Arrosagaray | ......... | A47F 3/0434 62/246 |
| 2007/0188986 A1 * | 8/2007 | Kobayashi | .............. | G09F 27/00 361/679.21 |
| 2009/0059501 A1 * | 3/2009 | Yamaguchi | ........ | G02B 27/0176 361/679.3 |
| 2009/0231687 A1 * | 9/2009 | Yamamoto | ........... | G02B 27/017 359/359 |

(Continued)

FOREIGN PATENT DOCUMENTS

EP    3779559 A1 *   2/2021   ......... G02B 27/0172

OTHER PUBLICATIONS

Brütting et al., Bending-Active Segmented Shells, Proceedings of the IASS Annual Symposium 2017, "Interfaces: architecture.engineering.science", Sep. 25-28, 2017, Hamburg, Germany (10 pages).

(Continued)

*Primary Examiner* — Dmitriy Bolotin
(74) *Attorney, Agent, or Firm* — Brian J. Pangrle

(57) ABSTRACT

A headset can include a head mount; a support coupled to the head mount; and a multiply curved display coupled to the support.

22 Claims, 15 Drawing Sheets

(56) References Cited

U.S. PATENT DOCUMENTS

| | | | |
|---|---|---|---|
| 2013/0321925 A1* | 12/2013 | Jacobs | G02B 27/0176 29/428 |
| 2015/0219902 A1* | 8/2015 | Kim | G06F 3/013 345/8 |
| 2015/0287166 A1* | 10/2015 | Cerny | G06T 17/20 345/423 |
| 2016/0004085 A1* | 1/2016 | Stroetmann | G02B 27/017 345/8 |
| 2016/0377869 A1* | 12/2016 | Lee | G02B 27/0172 359/631 |
| 2017/0038588 A1* | 2/2017 | Passmore | G06T 15/506 |
| 2017/0039766 A1* | 2/2017 | Passmore | G02B 27/0176 |
| 2017/0115489 A1* | 4/2017 | Hu | G06T 19/006 |
| 2017/0235147 A1* | 8/2017 | Kamakura | G02C 5/126 359/630 |
| 2018/0052309 A1* | 2/2018 | Lee | G02B 27/0101 |
| 2018/0160097 A1* | 6/2018 | Weng | H04N 5/77 |
| 2018/0284454 A1* | 10/2018 | Reed | G06V 20/20 |
| 2019/0075689 A1* | 3/2019 | Selvakumar | H05K 7/20972 |
| 2019/0101984 A1* | 4/2019 | Talati | G06N 20/00 |
| 2019/0155037 A1* | 5/2019 | Matsumura | G02B 25/04 |
| 2019/0243130 A1* | 8/2019 | Lamkin | G02B 27/0075 |
| 2019/0250332 A1* | 8/2019 | Cippant | G03B 37/04 |
| 2019/0260976 A1* | 8/2019 | Ishii | G06F 3/1446 |
| 2019/0289341 A1* | 9/2019 | Vasco de Oliveira Redol | G06T 19/006 |
| 2019/0333424 A1* | 10/2019 | Zhu | G09F 9/33 |
| 2019/0349575 A1* | 11/2019 | Knepper | G06F 3/013 |
| 2020/0005738 A1* | 1/2020 | Ishii | G06F 3/012 |
| 2020/0034105 A1* | 1/2020 | Yoshizumi | H10K 77/111 |
| 2020/0064653 A1* | 2/2020 | Tsao | G06F 3/011 |
| 2022/0172277 A1* | 6/2022 | Ang | G07F 11/165 |
| 2022/0223805 A1* | 7/2022 | Lee | H01L 51/5275 |

OTHER PUBLICATIONS

Cakmakci et al., Head-Worn Displays: A Review, Journal of Display Technology, vol. 2, No. 3, Sep. 2006 (19 pages).

Eigenraam et al., "Concepts and prototypes for flexible moulds for production of double curved elements", Proceedings of the International Society Of Flexible Formwork (ISOFF) Symposium (Amsterdam, Aug. 2015) (14 pages).

Thompson, S., Motion Sickness in VR: Why it happens and how to minimise it, VirtualSpeech.com (https://virtualspeech.com/blog/motion-sickness-vr) Apr. 27, 2020 (11 pages).

Scalp Micropigmentation—Adding the Hairline, (https://www.dermimatch.com/scalp-micropigmentation-adding-the-hairline/) Aug. 14, 2020 (5 pages).

Enovo Thinkpad X1 Fold Brochure, LENOVO Aug. 2020 (3 pages).

* cited by examiner

DISPLAY HEADSET

TECHNICAL FIELD

Subject matter disclosed herein generally relates to display headsets.

BACKGROUND

A headset can include a display and may be, for example, a virtual reality headset, an augmented reality headset, etc.

SUMMARY

A headset can include a head mount; a support coupled to the head mount; and a multiply curved display coupled to the support. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
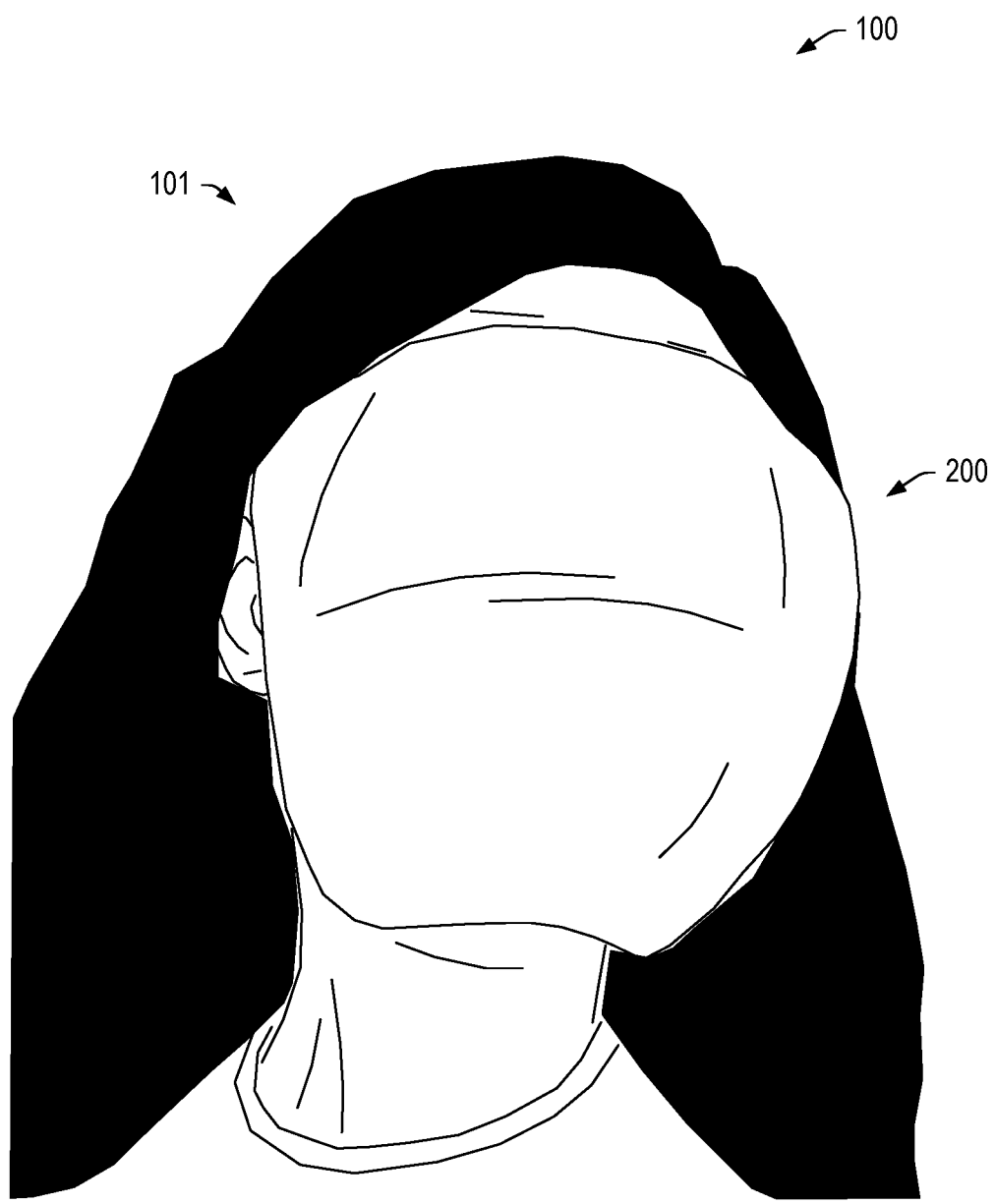
FIG. 1 is a diagram of an example of a headset.

FIG. 1 shows a scenario 100 of a user 101 wearing a headset 200 that can include one or more displays where the one or more displays can provide a curved viewing surface.

Figure 2:
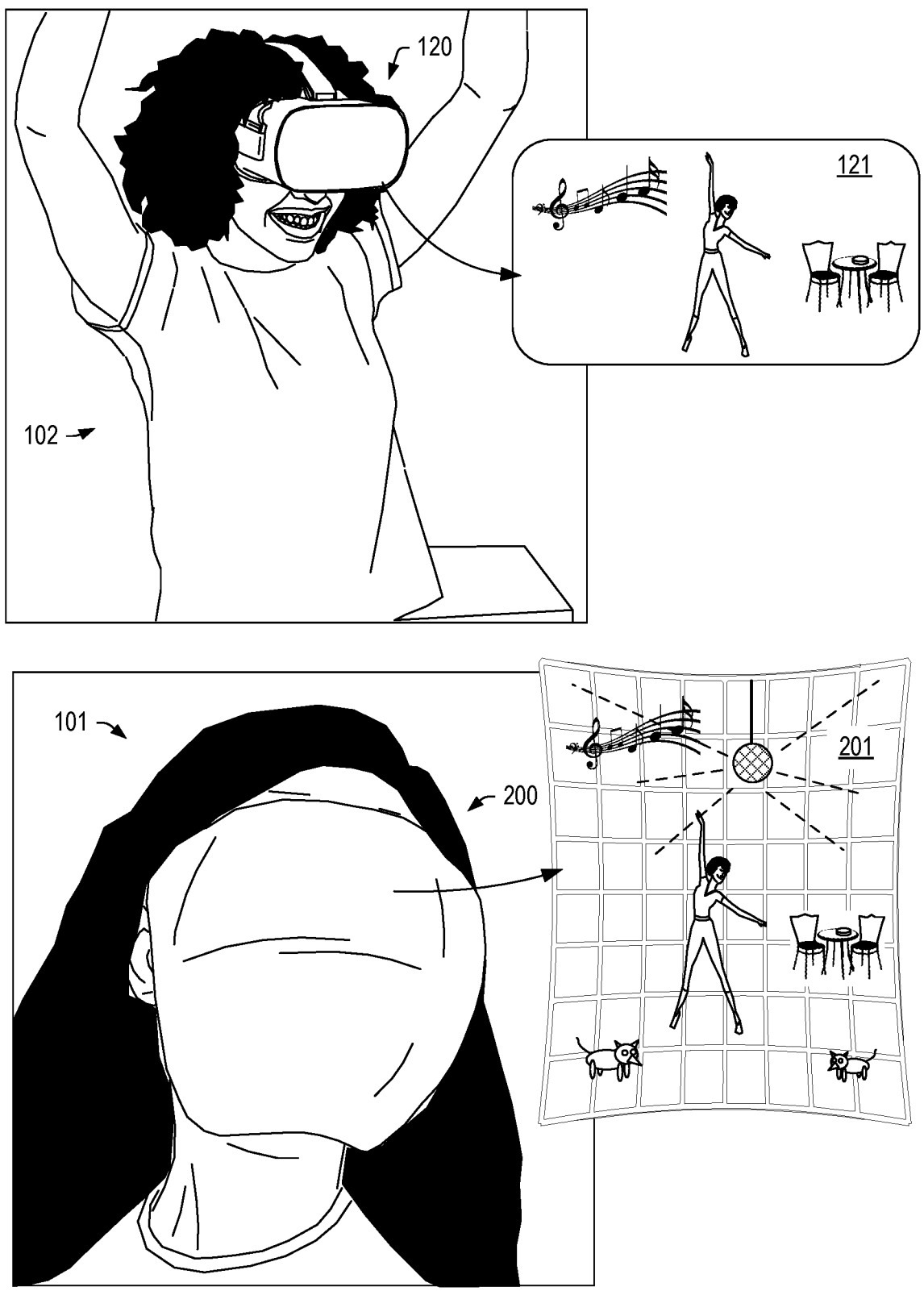
FIG. 2 is a series of diagrams of examples of headsets.

FIG. 2 shows a scenario of a user 102 with a headset 120 having a view 121 and a scenario of a user 101 with the headset 200 having a view 201. As shown in FIG. 2, the headset 200 provides the view 201 as a larger field of view (FOV) than the view 121 of the headset 120. For example, the view 201 may provide a greater field of view experience than the view 121. In such an example, the view 121 may be a binocular type of view as if viewing an environment through binoculars; whereas, the view 201 may be a more realistic, larger and substantially unhindered view.

The human eyes can have a field of view of approximately 200 degrees by approximately 130 degrees with a 120 degree overlap. Some binocular, eyeglasses or goggles types of headsets can provide a limited FOV that is much less than that of the human eyes (e.g., some being less than 40 degrees). The headset 200 may be considered a wide FOV headset (e.g., can provide a FOV of 60 degrees or more) or considered an ultra-wide FOV headset (e.g., can provide a FOV of 90 degrees or more). The headset 200 can provide an appropriate eye to display clearance along with an appropriate display resolution such that a user can discern details rendered to the display. The headset 200 can include an LED-based type of display that is curved. As an example, the headset 200 can allow for a user to wear eyeglasses and/or contact lenses. As an example, the headset 200 may allow for wearing of specialized eyewear such as stereovision eyewear where the display may render specialized stereovision imagery. In such an example, one or more stereovision techniques may be utilized (e.g., active shutter, etc.).

In the example of FIG. 2, the view 201 includes various curved lines that aim to illustrate the curved nature of the headset 200, which may be a wrap-around type of headset that may wrap in one or more directions. As an example, the headset 200 can include a head mount, which may include earpieces that extend over the ears of the user 101 (e.g., covered by the user's hair in the example of FIG. 2). As an example, the headset 200 may include one or more other types of head mounts or head mount features (e.g., straps, cap, etc.). As an example, the headset 200 may include a cap feature that may be a shell (e.g., soft, hard, etc.) that fits over the top of a user's head.

For some users, a virtual reality (VR) headset can be, at least at a first moment, a bad experience. Some users can feel dizzy and feel nauseous. Since the headset display in a headset such as the headset 120 can restrict the human sight and limit the field of view, this experience can be very disappointing (e.g., viewing a small part of the scene in front of the user). With such a headset, if a user needs to see something that is placed near a shoulder, the user must move her head; whereas, a natural human field of view, such movement is not necessarily required. For example, in a natural setting a user may feel the presence and understand that someone or something is nearby through peripheral eyesight.

As an example, the headset 200 can improve a user's experience, for example, by enhancing how the headset presents content to users. With a larger display, a user can be able to see her surroundings in a manner that can diminish the need for the user to move her head.

As an example, the headset 200 can provide a user experience that may be enhanced with respect to the headset 120. As an example, a new and/or enhanced software development kit (SDK) may be provided. For example, consider a SDK that can leverage an increased field of view, less need for head movements, etc.

Figure 3:
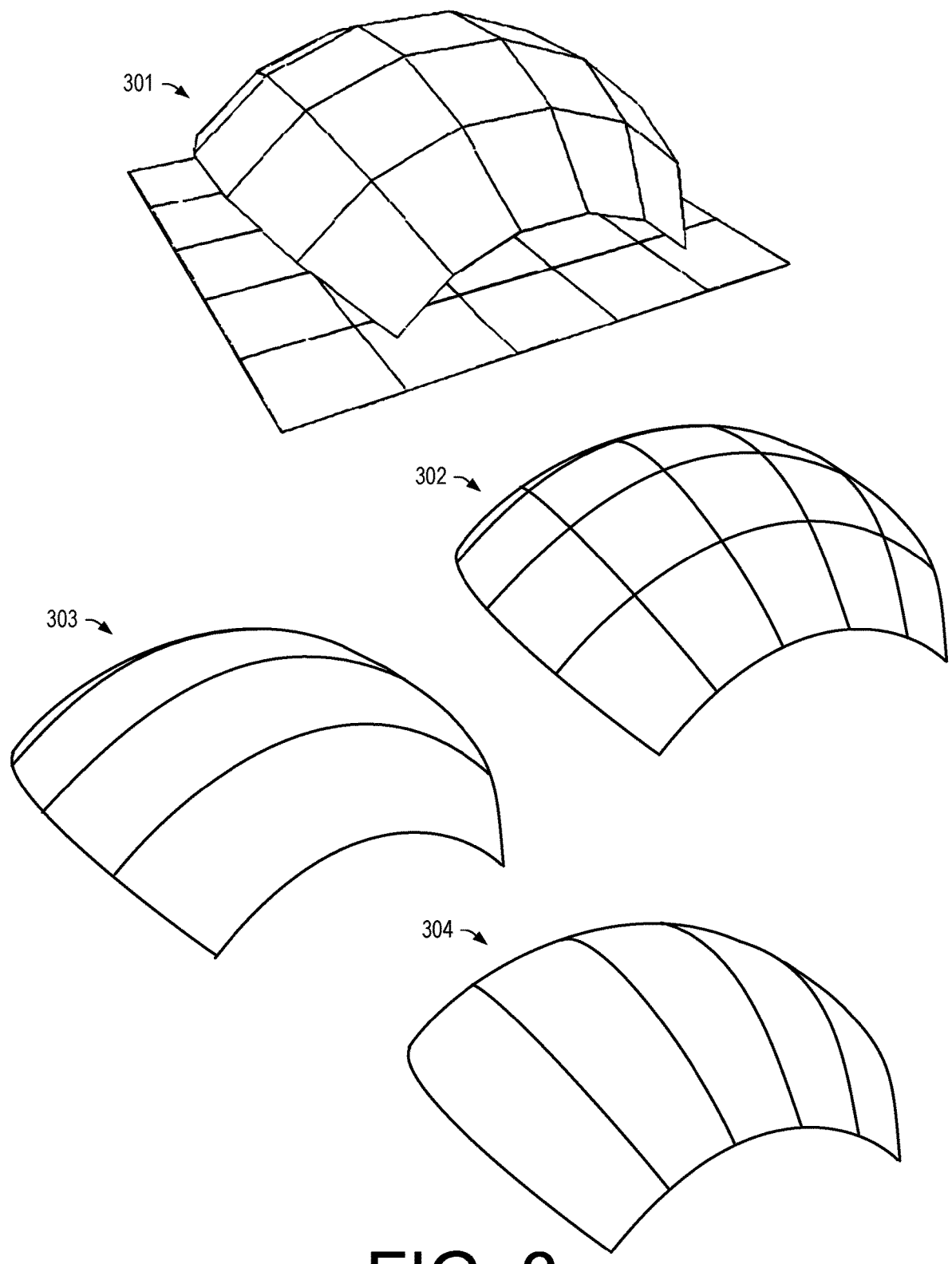
FIG. 3 is a series of perspective views of examples of structures.

FIG. 3 shows some examples of curved structures 301, 302, 303 and 304, which may be curved display structures. The structure 301 may be an adaptable structure that can be flattened to a substantially planar shape and then adapted into a curved shape. For example, consider a display that can be strained and/or stressed in one or more directions. In the example structures 301, 302, 303 and 304, lines are shown that include lines that run vertically and lines that run horizontally. As an example, a vertical axis may be defined and a horizontal axis may be defined for each of the structures 301, 302, 303 and 304.

As an example, a curved structure can be multiply curved where multiply means in multiple manners (e.g., in several ways, etc.). For example, a curved structure may be defined by more than one curve, which may be defined using one or more mathematical terms, equations, etc. An article by Eigenraam et al., "Concepts and prototypes for flexible moulds for production of double curved elements", Proceedings of the International Society Of Flexible Formwork (ISOFF) Symposium (Amsterdam, August 2015), is incorporated by reference herein. An article by Brütting et al., Bending-Active Segmented Shells, Proceedings of the IASS Annual Symposium 2017, "Interfaces: architecture.engineering.science", 25-28 Sep. 2017, Hamburg, Germany, is incorporated by reference herein.

As an example, an adaptable structure may be elastically deformable. For example, consider deformation of a structure such that a surface of the structure can be described in terms of strain in plane of the surface. In such an example, change of Gaussian curvature and its relation to strain can provide for understanding limits of deformation (e.g., without buckling, etc.). The Gaussian curvature (G$\kappa$) may be defined as the product of the two principle curvatures ($\kappa 1$ and $\kappa 2$) of a surface and named after C. F. Gauss who first described a measure of curvature. Deforming a surface, e.g. a flat surface (G$\kappa$=0), into a double curved surface (G$\kappa \neq 0$) (e.g., a multiply curved surface) involves some amount of strain. As material resist straining, the change of Gaussian curvature implies also in-plane stresses which above a certain level may cause buckling to occur. As such, strain may be determined a priori and a structure formed that can adapt to a desired shape without exceeding a strain limit. A problem may be posed as: how can a maximum of change of Gaussian curvature be obtained using from as little in-plane strain as possible?

A mathematical relationship between change of Gaussian curvature and in-plane strain can be set forth. For example, consider in-plane strain as including two components of axial strain and one of shear ($\varepsilon_{xx}$, $\varepsilon_{yy}$, $\gamma_{xy}$). The relationship between change of Gaussian curvature and the in-plane strain may be described, for example, with the following partial differential equation:

$$G_K = -\frac{\partial^2 \varepsilon_{xx}}{\partial x^2} + \frac{\partial^2 \varepsilon_{xy}}{\partial x^2} + \frac{\partial^2 \varepsilon_{yy}}{\partial x^2}$$

From the foregoing equation it can be noted that there are different possibilities to obtain the same level of change of curvature. As an example, it can be possible to obtain change of Gaussian curvature using only one of the three terms.

In FIG. 3, the structure 301 is one example of how a flat surface can be transformed into a double curved surface. In the structure 301, rectangles can be strained in an axial direction as they are further away from an unstrained center such that from an initially flat grid, the squares become tapered. The example structures 302, 303 and 304 show some examples of how a structure may be partitioned, for example, with respect to a support surface, a number of surfaces (e.g., sub-surfaces), etc. As an example, a structure may be foldable such that it can be folded into a more compact size. For example, consider a foldable display headset, etc. One or more of the structures 301, 302, 303 and 304 may be flexible structures that can be used for a flexible display (e.g., an adaptable display, etc.).

As an example, a structure may be defined in part by at least a portion of a lemon, which is a surface of revolution, defined by Kepler, which consists of less than half of a circular arc rotated about an axis passing through the endpoints of the arc. As an example, a football is a structure that can be defined by a number of lemon portions (e.g., lemon slices, etc.). As an example, a structure may be defined in part by a truncated lemon portion as a lemon portion with one or both ends truncated (e.g., as if cutting off an end or ends of a football). As an example, a structure may be defined by a number of lemon portions that form a structure greater than or equal to 180 degrees (e.g., a half a football or more) and less than 360 degrees (e.g., less than a full football).

In the examples of FIG. 3, the structures 301, 302, 303 and/or 304 may include one or more panels, which can be curved panels and/or panels that can be flattened. As an example, a structure may include curved panels that can be nested. For example, consider the structures 303 and 304 where the lines can indicate panels where the panels may be nested on top of one another, etc. In such an example, the size of the structures 303 and 304 may be reduced, for example, for transport, storage, etc.

As an example, panels may be separable pieces that can be coupled using one or more features such as, for example, key/keyway elements, magnets, etc. As an example, a structure may be provided as separate panels that can be folded and/or nested where, for example, magnets may be utilized to maintain the panels in a deployed state and/or a storage state. As an example, interfaces can exist such that panels can be electrically coupled to one another.

Figure 4:
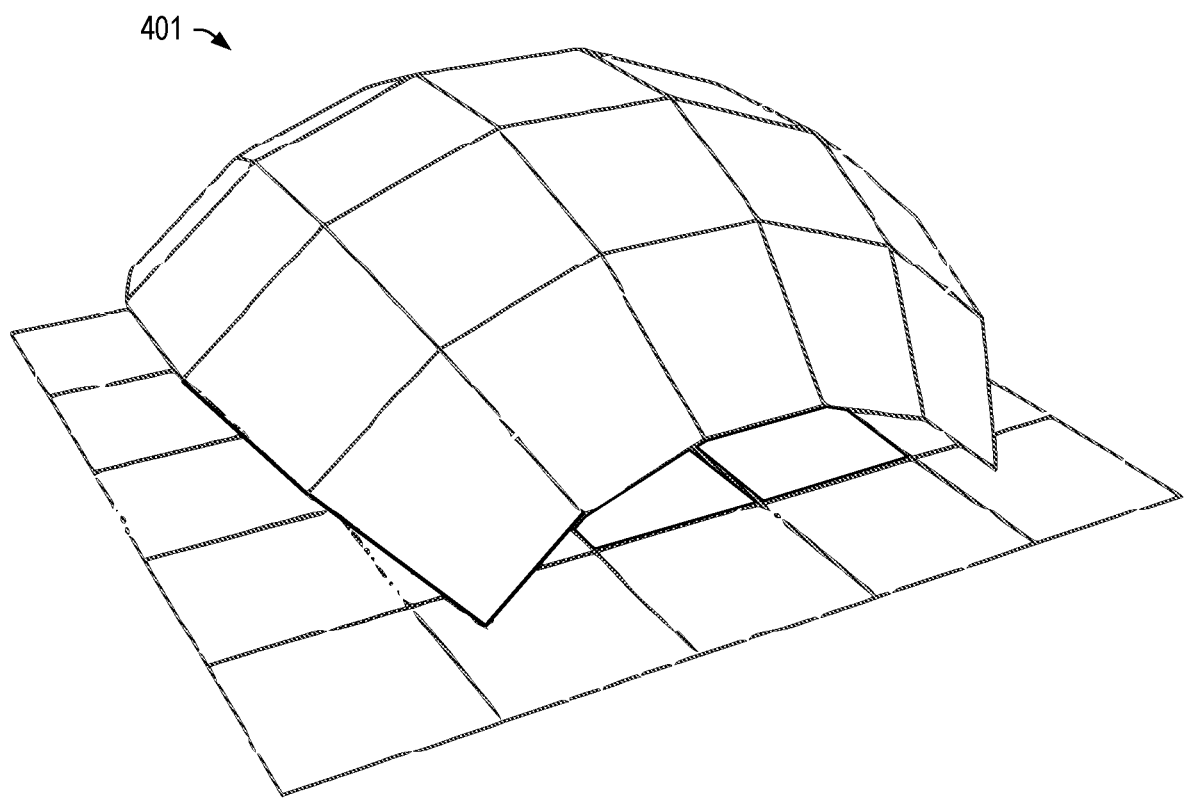
FIG. 4 is a perspective view of an example of a structures.

FIG. 4 shows another example structure 401. In the example of FIG. 4, the structure 401 can be formed from a level of Gaussian curvature where only shear deformation is involved (e.g., applied). Such a structure may be a flexible surface that can be used for a flexible display (e.g., an adaptable display, etc.).

Figure 5:
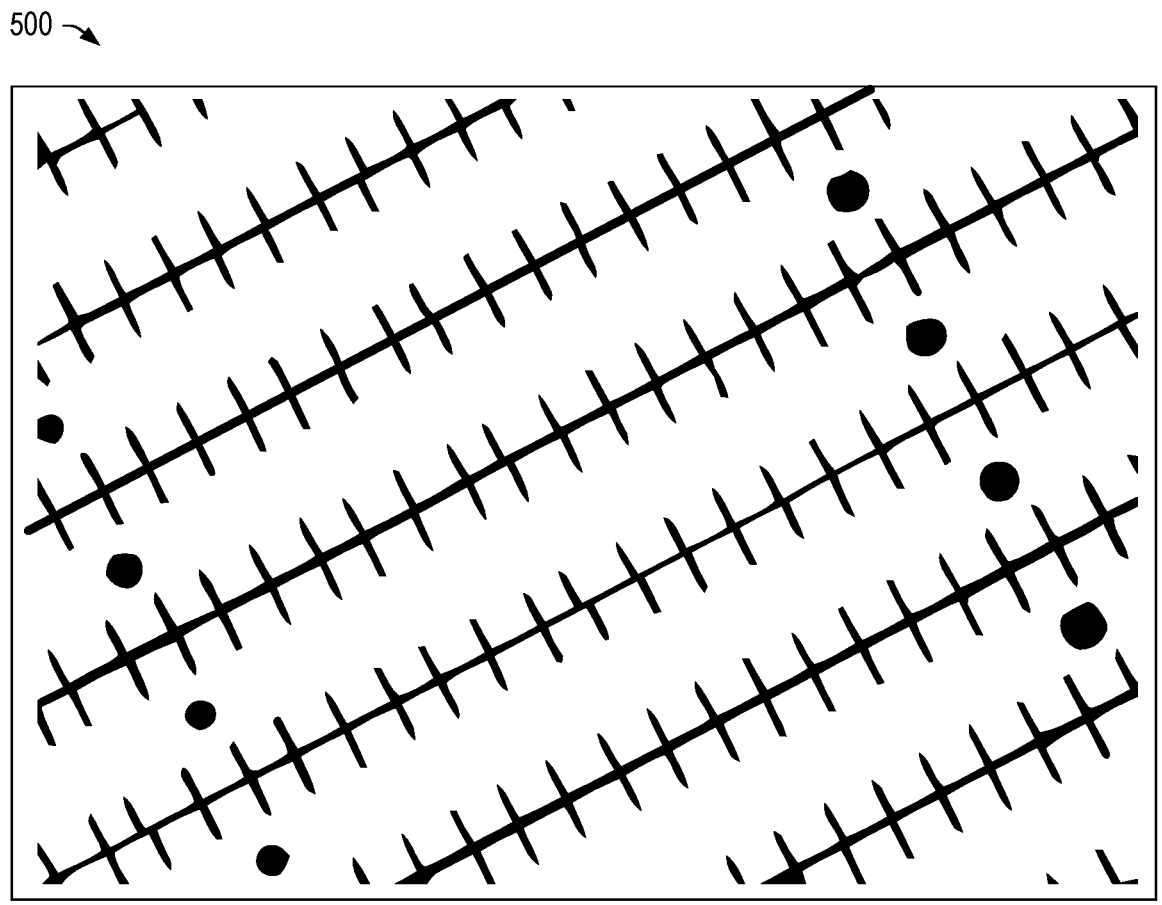
FIG. 5 is a diagram of an example of a support.

FIG. 5 shows an example of an arrangement of a support 500, which may be a support structure for a flexible display. For example, consider the support 500 being formed of strips with notches where the notches can reduce resistance to deformation of the strips (e.g., in a strong direction, etc.). As an example, the support 500 may be part of a display headset such as, for example, the display headset 200. Such a support may provide protection while still providing for a particular shape or shapes. As an example, such a support may provide for adaptability of a display headset. As an example, the support 500 may be coupled to a head mount, which may include one or more of straps, earpieces, etc.

Figure 6:
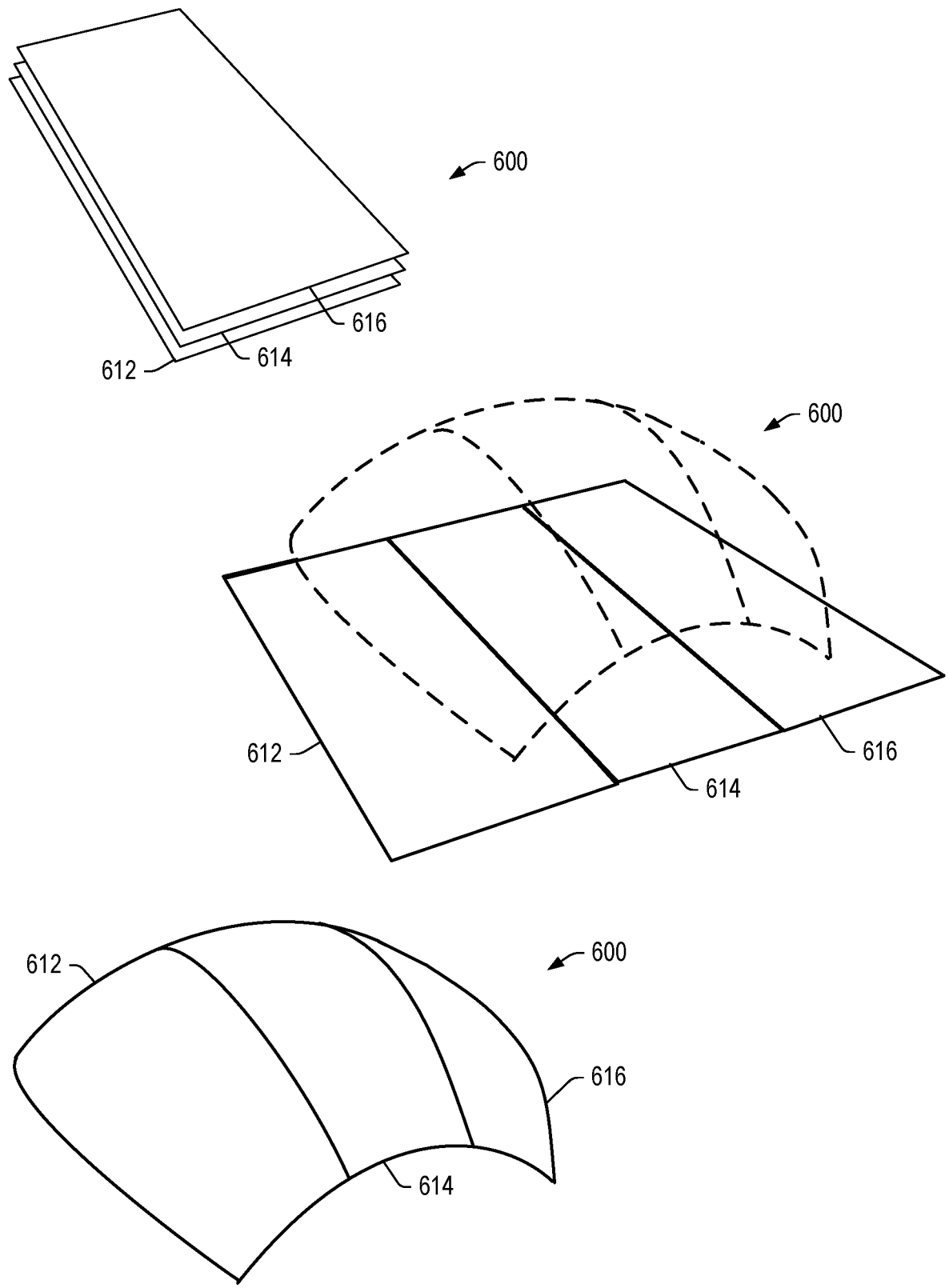
FIG. 6 is a series of diagrams of an example of a foldable and flexible structure.

FIG. 6 shows an example of a foldable and flexible display headset structure 600. As shown, the structure 600 can include panels 612, 614 and 616 where the panels 612, 614 and 616 can be folded to reduce size of a display headset. As an example, a method can include unfolding the panels 612, 614 and 616 of the structure 600 and then adapting (e.g., elastically deforming) the panels 612, 614 and 616 to form a desired shape, which may be a multi-curved shape (e.g., a double curved shape, a free-form shape, etc.). In such an example, limits of a shape may be constrained by a structure such as the example structure 500 of FIG. 5. For example, slots may be provided that can adapt within some spatial limit. Such an approach may aim to protect a flexible display (or flexible displays) from shaping that may give rise to a risk of damage (e.g., buckling, loss of adhesion, etc.).

Figure 7:
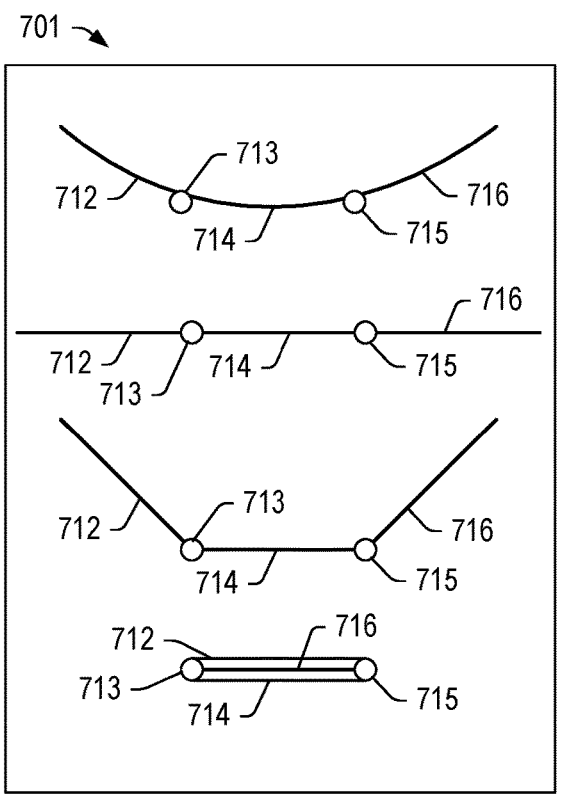
FIG. 7 is a series of diagrams of examples of foldable and flexible structures.
Figure 7:
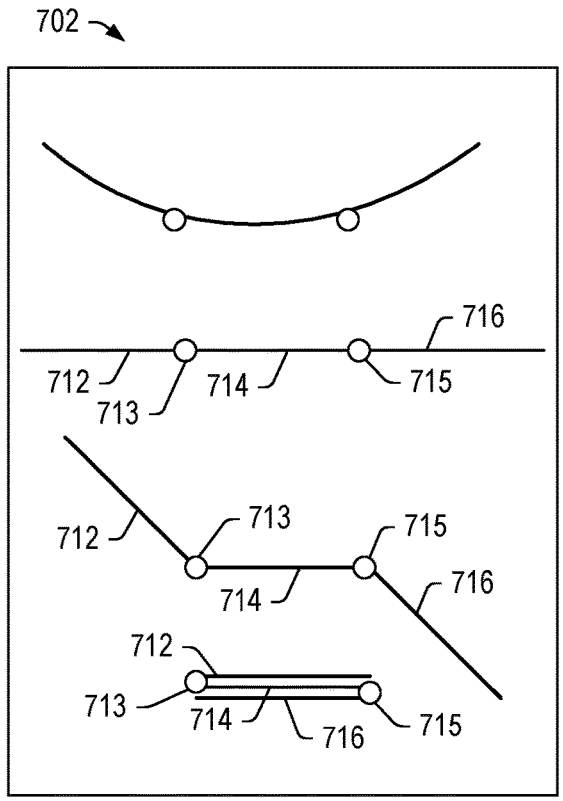
Figure 7:
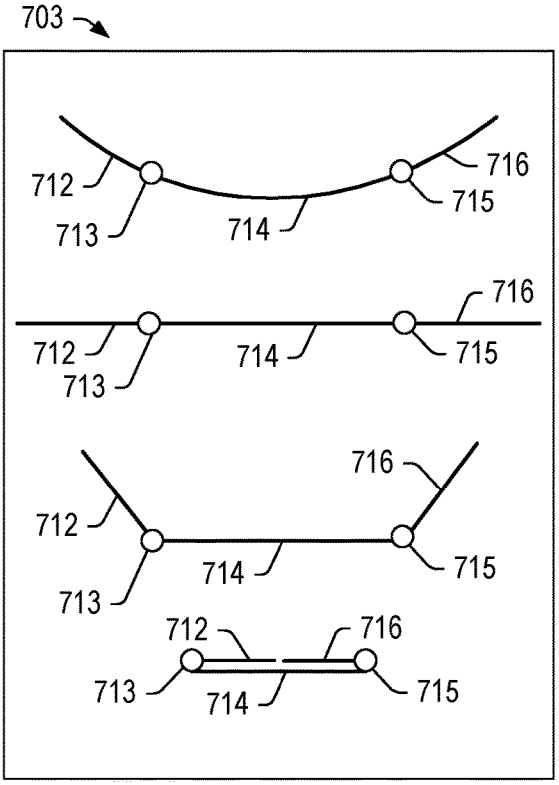
Figure 7:
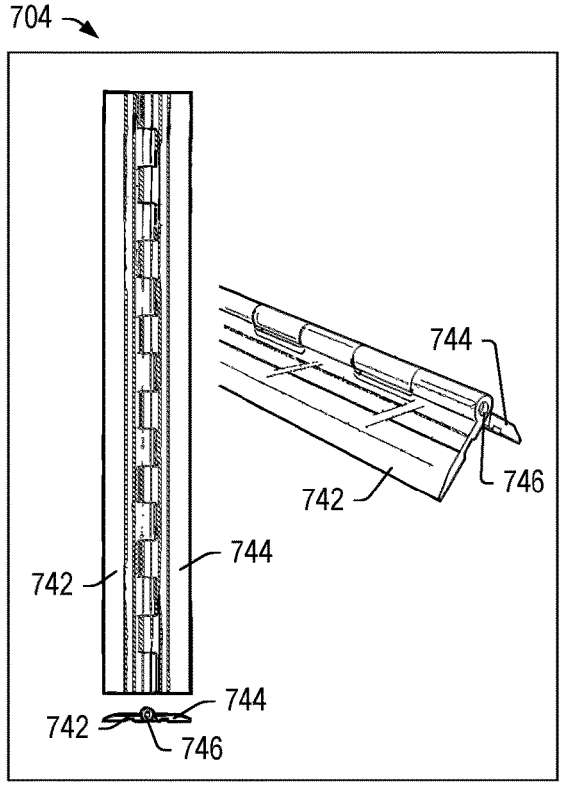

FIG. 7 shows some examples of folding structures 701, 702 and 703 and an example hinge assembly. As shown, each of the structures 701, 702 and 703 can include panels 712, 714 and 716 (e.g., two or more panels) where hinge regions or folding regions 713 and 715 may be provided that may be expected to bend more than one or more other regions of the folding structures 701, 702 and 703. For example, a structure can include panels that can be shaped with a desired amount of curvature within some limits as may be determined by support (see, e.g., FIG. 5) and/or display components (e.g., layers, etc.) and regions that can be supported differently to accommodate folding (e.g., for an overall reduction in size, etc.).

As shown, the folding structure 701 may fold two panels 712 and 716 inwardly such that the two panels 712 and 716 overlap a center panel 714. The folding structure 702 may fold one panel 712 in and another panel 716 back. The folding structure 703 may fold two panels 712 and 716 inwardly where they do not overlap and where a main panel 714 is larger than the two panels 712 and 716.

As mentioned, the example structures 701, 702 and 703 may include one or more hinge assemblies. As shown, the structures 701, 702 and 703 can include flexible panels such that a curved structure can be formed. For example, a hinge assembly or hinge region may be foldable where such a hinge may be a flexible piano style hinge assembly.

In FIG. 7, the example hinge assembly 704 can include one or more resilient components (e.g., elastomeric, etc.) such that the hinge assembly 704 can be curved along it longitudinal axis (e.g., folding axis). As shown, the hinge assembly 704 can include leaves 742 and 744 that are interwoven (e.g., interleaved) along a barrel region and supported by one or more pins (e.g., an axle or axles) 746 where the pin or pins 746 can be flexible. As an example, the hinge assembly 704 can be in a substantially straight configuration for folding of panels and be in a curved configuration for deployment of panels that form a display of a headset. As an example, the hinge assembly 704 may be configured to provide a desired amount of friction such that the panels can be adjusted (e.g., shaped) and held firmly in a desired adjusted shape.

As an example, a hinge assembly may accommodate a radius of curvature of a display where the display may include separate and/or integral panels that can be folded where a folded region defines the radius of curvature (e.g., in a storage state or storage orientation). As explained, a hinge assembly can be flexible and shapeable. As an example, a hinge assembly may include elastomeric and/or other material that can provide for shaping and, for example, maintaining a shape. For example, consider one or more strips of metallic material that may be encased in an elastomeric material where the metallic material can be shaped and retain its shape. As explained, shaping may involve relatively gentle curving such as may be tolerated by a shapeable display.

As explained, a headset may include one or more features for assisting with storage, deployment, etc. For example, consider one or more magnets where such one or more magnets may help to keep a headset in a closed position and/or in an open position. As an example, a hinge assembly such as, for example, the hinge assembly 704, may include magnets in addition to a pin or pins or as an alternative to a pin or pins. In such an example, barrel portions may be joined via magnetic attraction forces.

Referring again to FIG. 2, the headset 200 is shown as being larger than the headset 120. As an example, the headset 200 may be a foldable headset such that its size can be reduced, for example, for storage, transport, etc.

Figure 8:
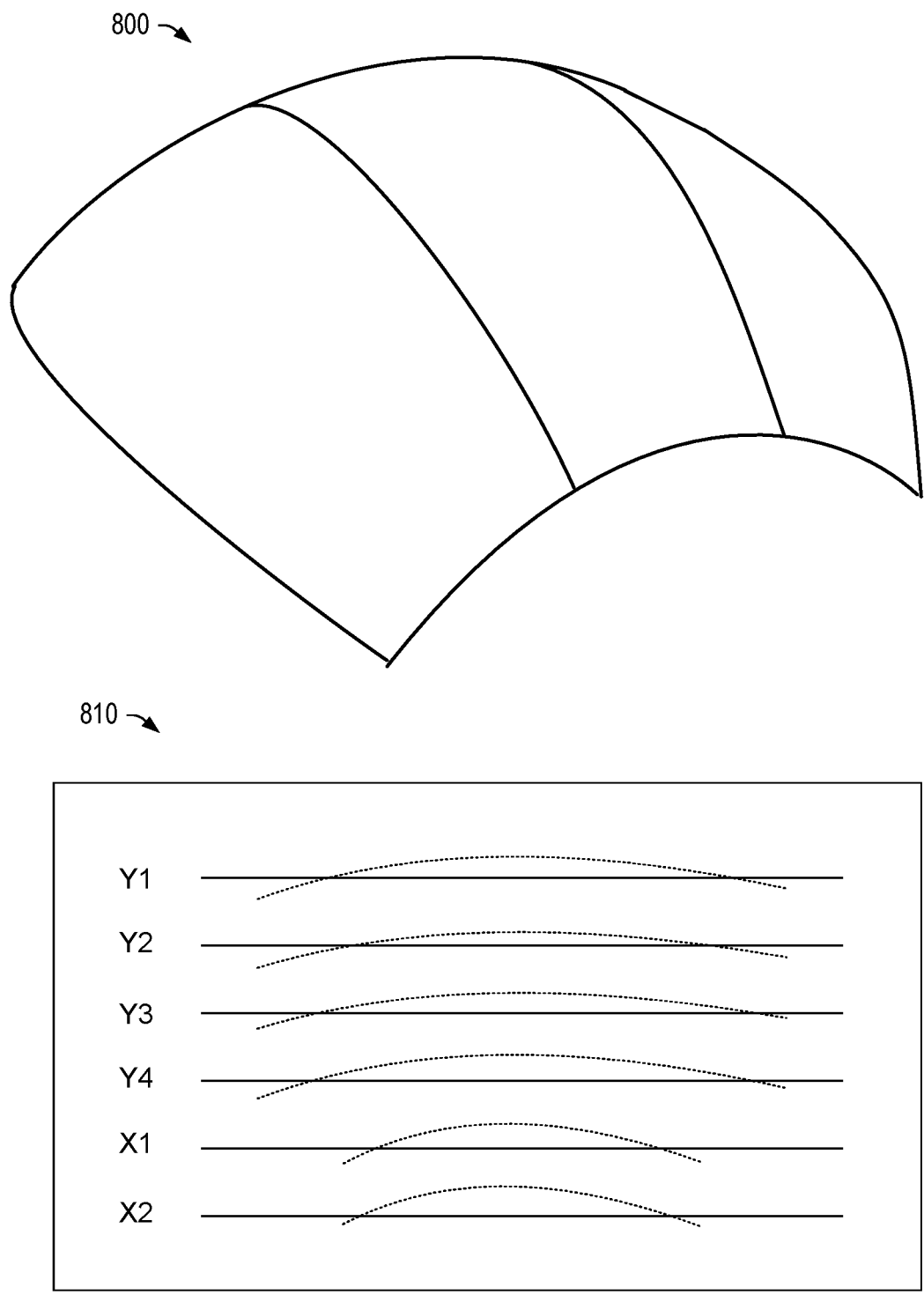
FIG. 8 is a series of diagrams of an example of a structure.

FIG. 8 shows an example structure 800 where sensors 810 may be included that can generate signals representative of a shape of the structure 800 where the structure 800 may be adaptable. In the example of FIG. 8, the sensors 810 can provide signals that may be utilized by a display headset, for example, to control rendering of content to a display or displays. In such an example, rendering can be controlled, optionally on an individual-by-individual type of basis. For example, one user may shape the structure 800 in one manner and another user may shape the structure 800 in another manner. Where sensors are included, a controller may utilize one or more sensors signals to determine the actual shape of the structure 800 and, for example, its relationship with respect to a user (e.g., a user's eyes, etc.). In such an example, a user may shape the structure 800 as desired where the structure 800 can sense its own shape, which may be utilized, for example, for appropriate rendering. As an example, a structure may provide feedback to a user to fine tune or otherwise refine a shape of the structure (e.g., for purposes of optimizing user experience, etc.).

Figure 9:
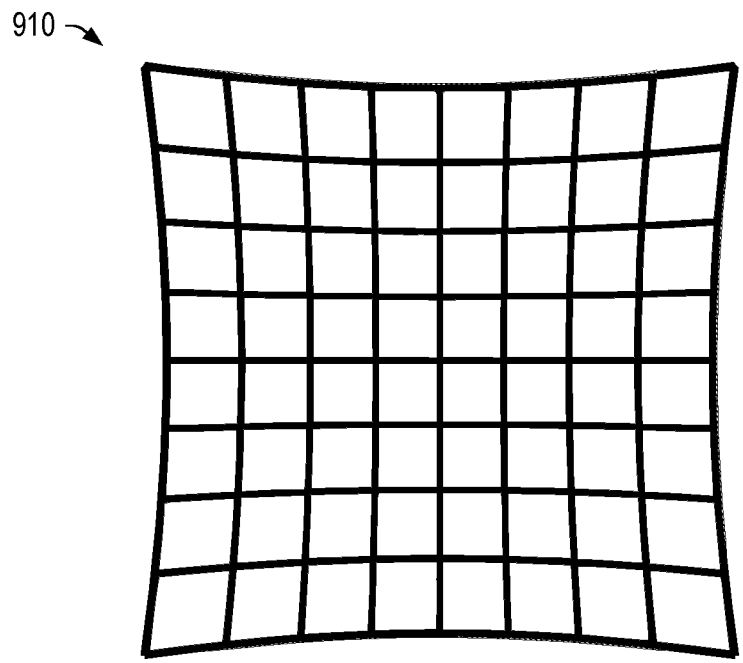
FIG. 9 is a series of diagrams of examples of types of distortion.
Figure 9:
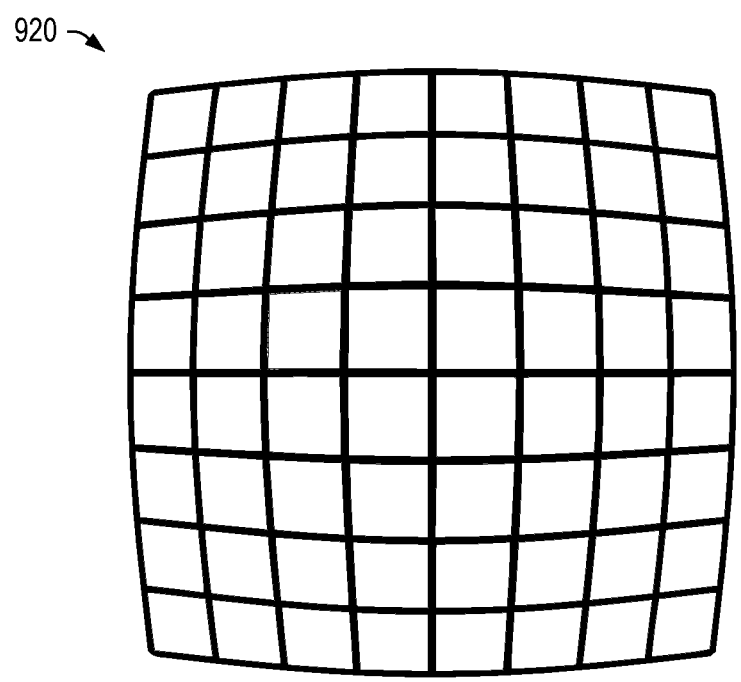

FIG. 9 shows some examples of types of distortion 910 and 920 that may be controlled to account for distortion and/or to impart distortion. The distortion 910 may be referred to as pincushion distortion while the distortion 920 may be referred to as barrel distortion.

As to images, for barrel distortion, image magnification decreases with distance from the optical axis. The apparent effect is that of an image which has been mapped around a sphere (or barrel). Fisheye lenses, which take hemispherical views, utilize this type of distortion as a way to map an infinitely wide object plane into a finite image area. In a zoom lens, barrel distortion appears in the middle of the lens's focal length range and is worst at the wide-angle end of the range. For pincushion distortion, image magnification increases with the distance from the optical axis. The visible effect is that lines that do not go through the center of the image are bowed inwards, towards the center of the image, like a pincushion. Another type of distortion is mustache distortion, which can be a mixture of barrel and pincushion. It may also be referred to as a type of complex distortion that can start out as barrel distortion close to the image center and gradually turn into pincushion distortion towards the image periphery (e.g., making horizontal lines in the top half of the frame look like a handlebar mustache).

Mathematically, barrel and pincushion distortion tend to be quadratic, meaning they increase as the square of distance from the center. In mustache distortion the quartic (degree 4) term can be significant: in the center, the degree 2 barrel distortion is dominant, while at the edge the degree 4 distortion in the pincushion direction dominates. Other distortions are in principle possible—pincushion in center and barrel at the edge, or higher order distortions (degree 6, degree 8). Higher order distortions may in various instanced be small relative to barrel and/or pincushion effects.

As an example, a display can be an organic light-emitting diode (OLED or organic LED) display. An OLED is a LED in which an emissive electroluminescent layer (or layers) is a film (of films) of organic compound(s) that emits light in response to an electric current. An organic layer can be situated between two electrodes where at least one is transparent.

Figure 10:
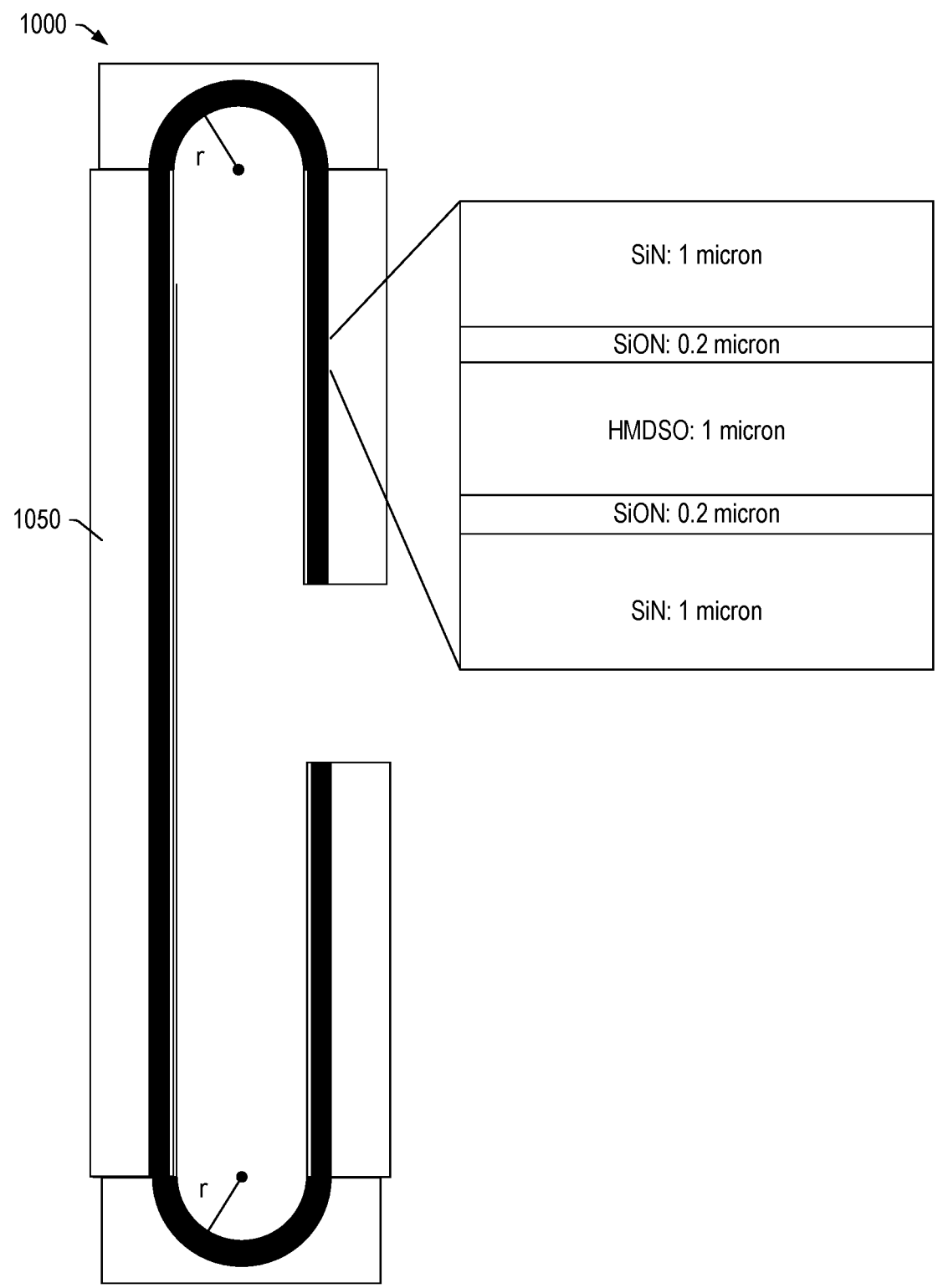
FIG. 10 is a diagram of an example of a display and an example of a support.

FIG. 10 shows an example of a flexible display 1000 coupled to a support 1050 with some example layers and approximate thicknesses, which can include one or more SiN layers, one or more SiON layers and a hexamethyldisiloxane (HMDSO) layer. The SiN and/or SiON layers may be insulator layers. An OLED display includes an organic layer or layers that tend to be thin and based on chemically active materials, which may be damaged by exposure to moisture or oxygen. While a rigid OLED may be encapsulated with glass; however, as glass tends to be brittle, one or more other materials can be utilized for a foldable display. For example, consider OCA (optical clear adhesive) and a polarizer; noting that a thin flexible glass may be an option if available. In the example of FIG. 10, one or more other layers may include, for example, a cover window layer, one or more adhesive layers, one or more polarizer layers, one or more retarder layers, one or more filter layers, etc.

As an example, an OLED may utilize a transparent polyimide (PI) film where a hard coating can be applied top and bottom to compensate for the weak hardness. Transparent PI film for a cover window can be of a hardness of about 4H to 6H or more. As an example, an epoxy-siloxane hybrid hard coating transparent PI may be utilized. As an example, a PSA (pressure sensitive adhesive) may be utilized, for example, for pasting layers (e.g., may be used in about 4 or so layers in an OLED); noting that OCA is a type of PSA that can be used to attach a cover window and a polarizer.

For a flexible OLED display, a cover window and polarizer(s) tend to be the thickest and the closest to the exterior environment. A flexible OLED OCA may be about 100 microns to 150 microns thick; though techniques may provide for lowering the thickness to 100 microns or less. As to a polarizer, it acts to reduce reflection of external light, enhance outdoor visibility, and accurately represents black. A polarizer layer may be less than 150 microns in thickness (e.g., consider 100 microns or less).

In the example of FIG. 10, the flexible display 1000 may include one or more folding axes where, for example, a bend radius can be defined by properties of the display, which can be a flexible and foldable OLED display.

As an example, the flexible display 1000 may include one or more support structures (see, e.g., the support 500, the support 1050, etc.). For example, consider one or more support structures that can provide for shaping (e.g., adapting) the flexible display to a desired shape, which may be limited via one or more features of the one or more support structures, etc. As an example, a support structure may include slots that can provide for shaping within some limit(s) so as to protect a flexible display.

As an example, a flexible display may include one or more features of a 13.3 inch (e.g., approximately 34 cm) Quantum Extended Graphics Array (QXGA) foldable 2K (1536×2048 pixel resolution, approximately 3.2 million pixels) OLED, touchscreen with 300 nits (see, e.g., LENOVO THINKPAD X1 Fold, foldable computing device). As an example, a lesser or a higher resolution display may be utilized. As an example, a lesser or a greater nits value display may be utilized. As an example, a flexible display may include touch sensing circuitry or may not. Where touch sensing circuitry is included, a user may be able to interact with the flexible display via touch, for example, where one or more GUIs are renderable to the flexible display. In such an example, a user may readily select content, desired settings, etc. For example, consider a user making selections on a display of a headset before placing the head on her head. Such an approach can expedite a user's experience and, for example, may allow a user to watch without placing the headset on her head. In such an example, a user may browse content and see what of experiences, games, etc., the user may expect. Once the user identifies desirable content, the user may queue it up and place the headset on her head. Such an approach may minimize on head time such that "time-on-head" is dedicated to a desired AR and/or VR experience.

As an example, a VR headset can be a head-mounted device that provides VR for a wearer (e.g., and/or AR for a wearer). VR headsets find use with various types of video games; though various VR headset may be utilized for one or more other types of applications such as, for example, simulators, trainers, virtual meetings, etc. A VR headset can include a stereoscopic head-mounted display that can provide separate images for each eye, sound (e.g., stereo, etc.), and motion tracking sensors, which may include one or more of gyroscopes, accelerometers, magnetometers, structured light systems, etc. Various VR headsets include eye tracking sensors. As an example, a VR headset can be operate with one or more accessors such as, for example, a gaming controller, a wand, a wrist tracker, etc.

As an example, a gaming controller can allow a user to interact with a game, which may be a music game, a sports game, a dance game, etc. As an example, a VR system may include components of a full body reading system such as the KINECT system or the PLAYSTATION MOVE system. Such gaming systems use VR to control avatars within a game, where the user's movements can be copied by an avatar, for example, to complete in a game.

As mentioned, various VR headsets are used for training such as, for example, medical training where procedures may be performed in a virtual, controlled environment (e.g., consider students performing surgeries on virtual patients, reviewing surgeries from the perspective of a lead surgeon, etc.).

As an example, a headset may be an augmented reality headset (AR headset). AR technology can provide an interactive experience of a real-world environment where the objects that reside in the real world are enhanced by computer-generated perceptual information, sometimes across multiple sensory modalities, including visual, auditory, haptic, somatosensory and olfactory.

As an example, a standalone VR headset can include onboard rendering hardware (e.g., consider one of the OCULUS headsets such as QUEST, GO, etc.). A standalone headset can be portable and suitable for use in indoor environments and/or outdoor environments (e.g., in the woods, at a beach, etc.).

As an example, a VR headset can render one or more graphical user interfaces (GUIs) that allow a user to understand a shape of the headset. For example, consider a GUI that can instruct a user as to a suitable shape, optionally without removing the VR headset from the user's own head.

Figure 11:
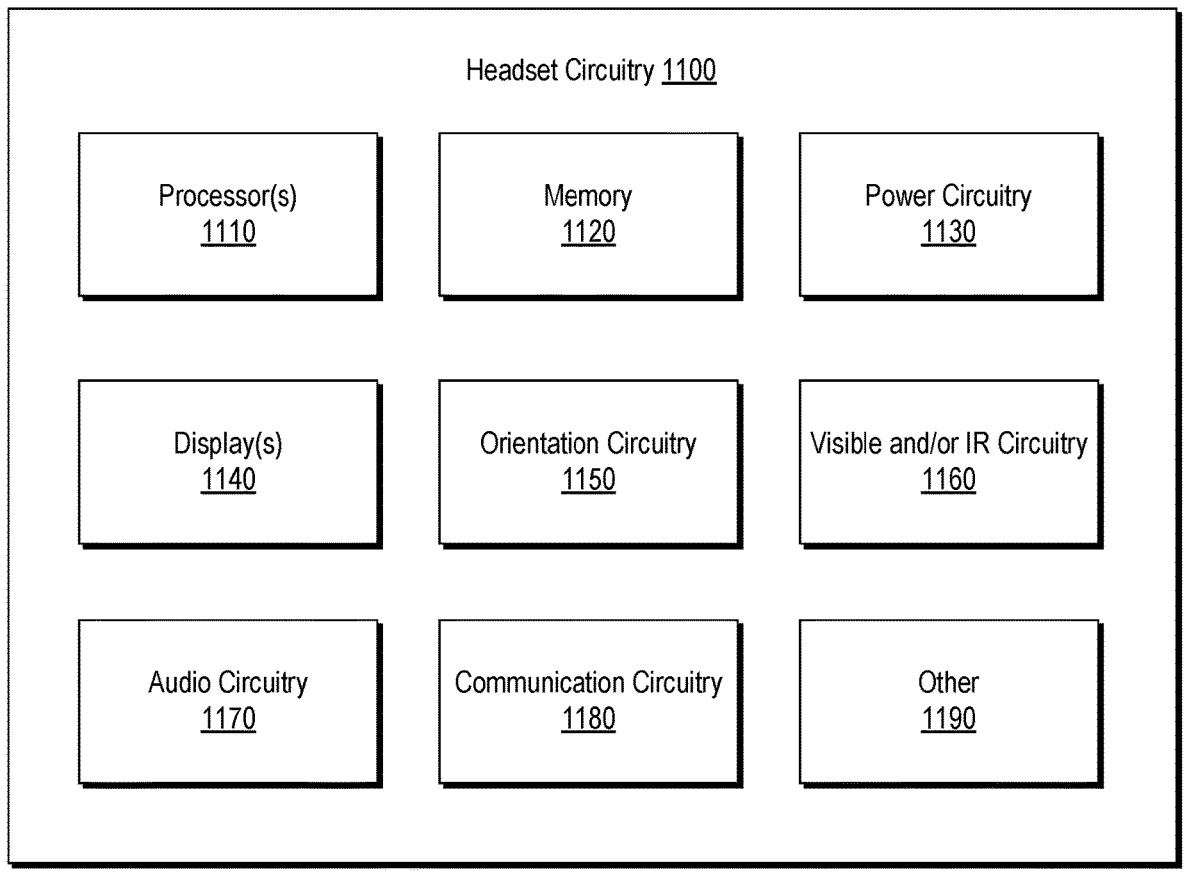
FIG. 11 is a diagram of examples of circuitry.

FIG. 11 shows some examples of headset circuitry 1100, which can include one or more processors 1110, memory 1120 accessible to at least one of the one or more processors 1110, power circuitry 1130, one or more displays 1140, orientation circuitry 1150, visible and/or infrared (IR) circuitry 1160 (e.g., as locating circuitry, etc.), audio circuitry 1170, communication circuitry 1180 and optionally one or more other types of circuitry 1190.

As explained with respect to FIG. 8, a headset can include one or more sensors where such sensors may provide feedback as to shape. Such sensors may be included in the one or more other types of circuitry 1190 of the example of FIG. 11 where, for example, the one or more processors 1110 can utilize sensor signals to determine appropriate rendering, image correction, optimization of shape, etc., optionally with feedback to a user to hone a shape (e.g., make minor adjustments to optimize rendering, user experience, etc.).

As an example, the headset circuitry 1100 can include fan circuitry. For example, consider one or more air movers (e.g., fans) that can help to circulate air in a space between the headset 200 and a user's face. In such an example, moisture (e.g., humidity) may be controlled such that a display does not fog-up.

As an example, the one or more displays 1140 may include one or more OLED displays, with a suitable refresh rate in excess of approximately 30 Hz. As an example, the orientation circuitry 1150 can include one or more of an accelerometer, a gyroscope, and a magnetometer. As an example, the visible and/or IR circuitry 1160 can include one or more IR emitters, one or more IR detectors, one or more visible wavelength detectors, etc. As an example, the audio circuitry 1170 can include one or more speakers (e.g., earphone speakers) and/or one or more wireless transmitters (e.g., BLUETOOTH, etc.).

As an example, a VR headset can include circuitry such as a TOSHIBA TC358870XBG 4K HDMI to MIPI dual-DSI converter, a CYPRESS CYUSB3304 USB 3.0 hub controller, a ST MICROELECTRONICS STM32F072VB ARM CORTEX-M0 32-bit RISC core microcontroller, a WINBOND W25Q64FVIG 64 Mb serial flash memory, a NORDIC SEMICONDUCTOR nRF51822 BLUETOOTH smart and 2.4 GHz system on a chip (SoC), a CMEDIA CM119BN USB audio controller, a BOSCH SENSORTEC BMI055 6-axis inertial sensor, multiple TEXAS INSTRUMENTS TLC59401 16-channel LED driver with dot correction and grayscale PWM control, etc.

As an example, a VR headset can include one or more of a QUALCOMM SNAPDRAGON processor, SK HYNIX SRAM, a heat sink, a battery such as, for example, a 18650 battery format 2600 mAh battery, a microphone, an antenna, etc. As to the 18650 battery format, it can be approximately 65 mm (2.56 in) long or may be approximately 68 mm (2.68 in) long with an internal protection circuit (e.g., longer than an AA format battery).

As an example, a VR headset can include one or more features of the OCULUS GO VR headset. As an example, a VR headset can include a QUALCOMM SNAPDRAGON 821 SoC, 3 GB of LPDDR4 RAM, 32 GB or more of internal storage, an integrated ADRENO 530 GPU (e.g., approximately 500 GFLOPS of graphics performance), a 2600 mAh battery, non-positional three-degrees of freedom tracking, one or more proximity sensors, an accessory controller, etc.

As an example, a controller may be a wireless controller that can be an orientation-tracked remote controller with pointer capabilities that can interact with applications. As an example, a controller can include a touchpad, one or more buttons, a battery (e.g., an AA format battery, etc.), etc.

As an example, various techniques may be utilized for locating, tracking, etc. For example, consider one or more of controller-based and non-controller based hand tracking techniques where a hand tracking feature may enable the use of a hand or hands for input, optionally integrated with power unit locating circuitry.

As an example, the headset circuitry 1100 can include simultaneous localization and mapping (SLAM) circuitry, which may provide for constructing and/or updating a map of an environment while keeping track of a VR headset wearing user's location within the environment. As an example, the headset circuitry 1100 can include one or more OPTITRACK cameras (e.g., SLIM 13E, etc.), which may be utilized with one or more OPTITRACK tags (e.g., active, passive, active and passive, etc.). For example, a power unit may include a circuitry tag that can include one or more LEDs that can emit pulses detectable by camera circuitry. As an example, a camera can include features for IR and/or visible spectrum imaging, optionally with switching, one or more band-pass filters, etc.

As to dimensions of a VR headset such as the headset 120, consider, as an example, dimensions of approximately 190 mm×105 mm×115 mm (7.48 in×4.13 in×4.53 in) and, for example, a mass of approximately 468 g (1.032 lb). As explained, the headset 200 can have deployed size that may be larger.

As an example, a VR headset can be associated with a software development kit (SDK). As an example, a VR headset can include tracking sensor circuitry, which may include programmable instructions (e.g., firmware, software, etc.). As an example, a VR headset can include communication circuitry that can be operatively coupled to the Internet, for example, for virtual reality content to be downloaded and rendered.

Figure 12:
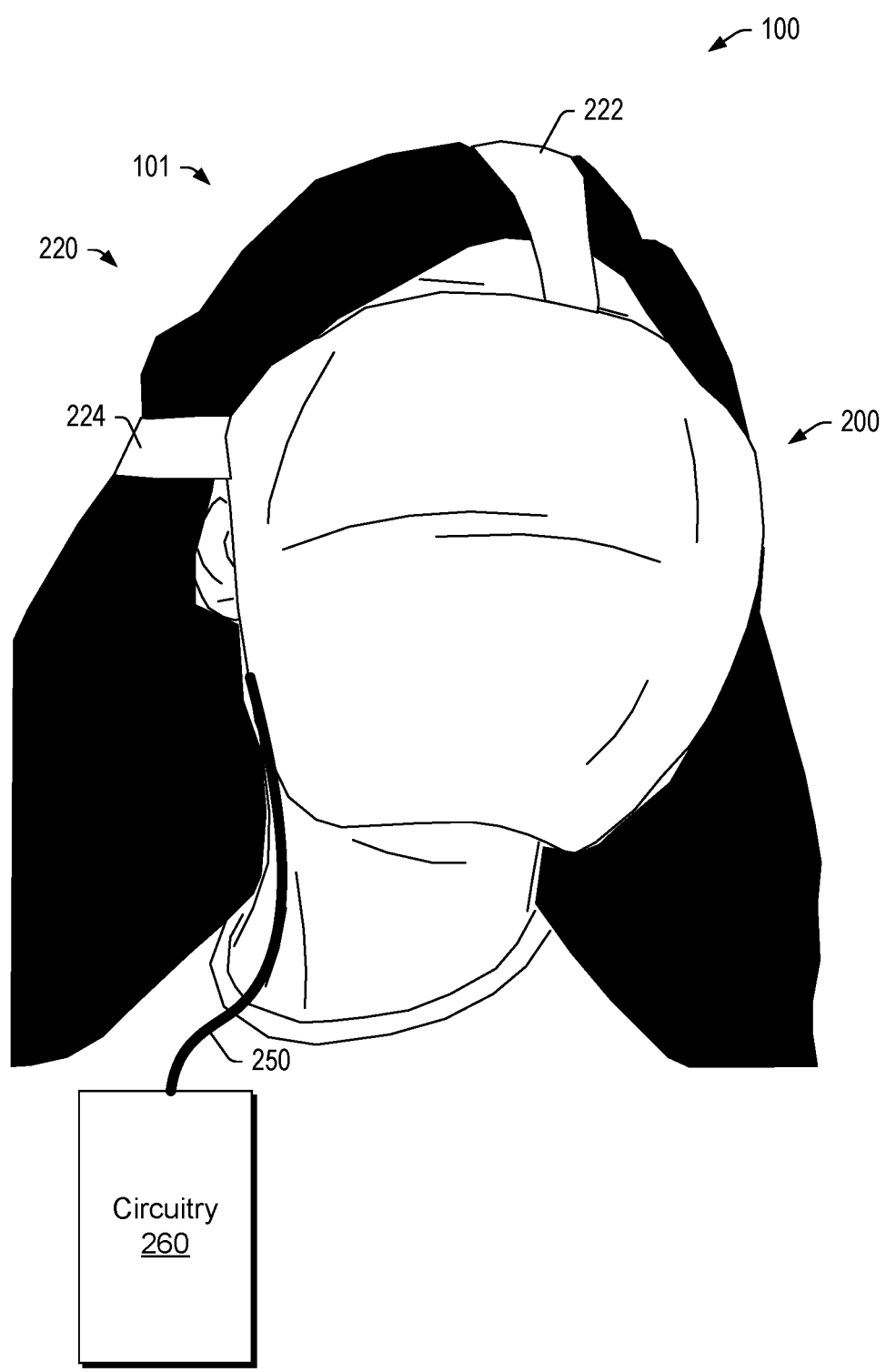
FIG. 12 is a diagram of an example of a headset and examples of straps.

FIG. 12 shows the headset 200 with an example head mount 220 that can include one or more straps, earpieces, etc. In the example of FIG. 12, the headset 200 is shown with examples of straps 222 and 224 along with a cable 250 that is coupled to circuitry 260. In such an example, the circuitry 260 may be in a box, a pack, etc., which can include a power supply (e.g., a battery, etc.). As an example, the circuitry 260 may be provided with a strap such that a user can strap the circuitry 260 at the user's waist, on one of the user's arms, etc. As an example, the circuitry 260 may be suitable for placing in a shirt or pants pocket.

As an example, the headset 200 may include earpieces, for example, as found on eyeglasses, which may be alternatives to one or more of the straps 222 and 224 or additional to one or more of the straps 222 and 224.

As shown in FIG. 12, the headset 200 can include a head mount 220 where a support is coupled to the head mount 220 and where a multiply curved display coupled to the support. In such an example, consider the support 500, the support 1050, etc. As an example, a support may be a multi-piece support or a unitary support. As an example, a support may be curvable such that it can accommodate a multiply curved shape. In such an example, the multiply curved shape can correspond to that of a curvable display, which may be a single panel or multiple panel display.

Figure 13:
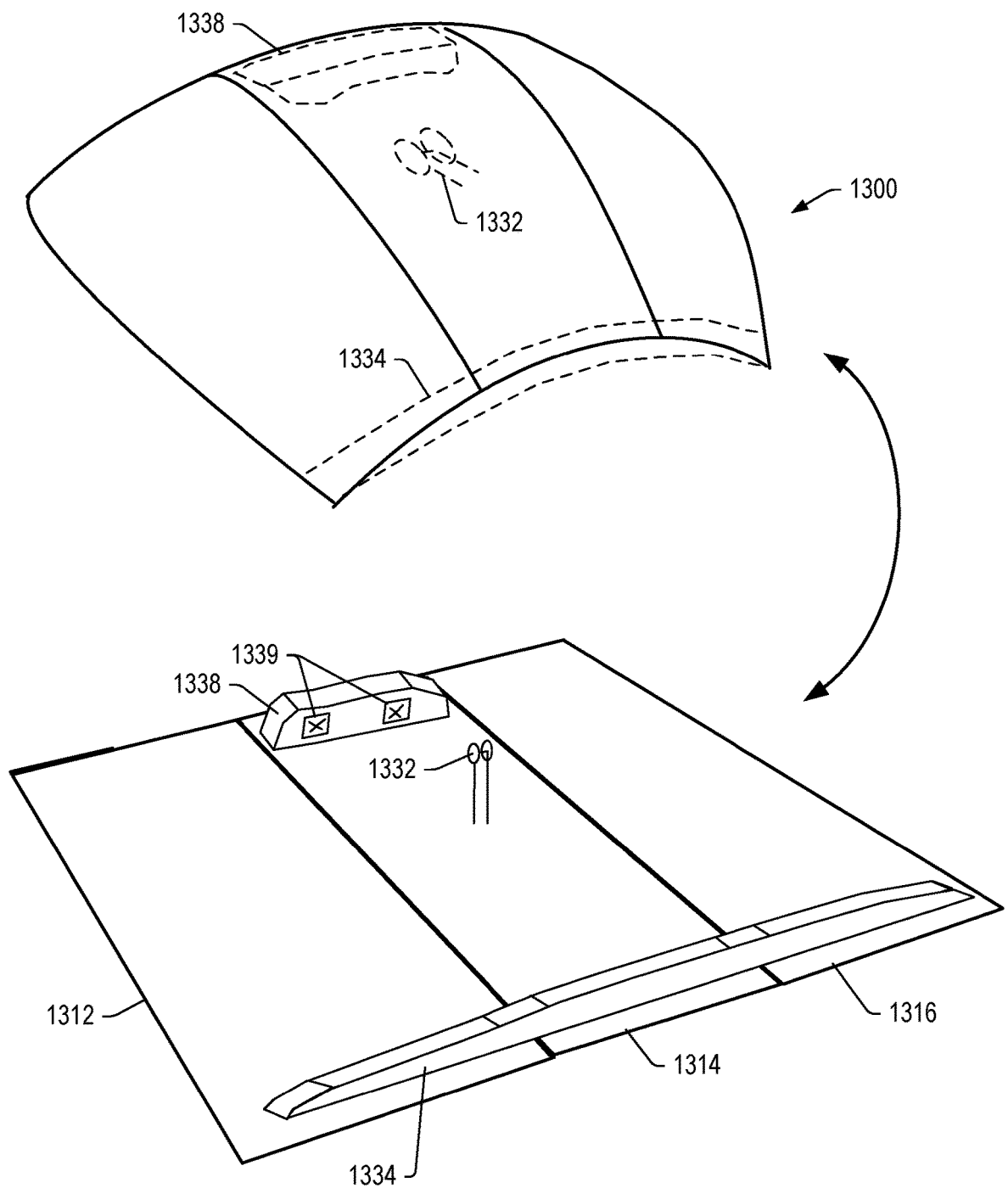
FIG. 13 is a diagram of an example of a headset and examples of cushions.

FIG. 13 shows an example headset 1300, which may or may not include a plurality of panels 1312, 1314 and 1316. As shown, the headset 1300 can include one or more cushions 1332, 1334 and 1338, which may act to cushion the headset 1300 against a user's head and/or to block ambient light from entering a space defined between the headset 1300 and a user's face. As shown, the cushion 1332 can be a nosepiece that includes one or more nose pads. As shown, the cushion 1334 can be a head cushion positionable at or above a forehead of a user and the cushion 1338 can be a chin cushion positionable at a chin of a user. In such an example, the headset 1300 can be supported on a user's face, optionally without a nosepiece or nose pad(s). As shown, the cushion 1332 as a nosepiece may be included, for example, as extending from one or more panels inwardly to contact a user's nose. Where the headset 1300 does not include a nosepiece or one or more nose pads (e.g., when supported by cushions, earpieces and/or headstrap(s)), a user's view may be uninterrupted, particularly downwardly toward the user's chin. In such an example, a user may have an improved experience, particularly for visualizations in the lower portion of the headset 1300. For example, consider an object rendered to the display and approaching the user's face from below. Such an experience can be quite limited in a headset that is a goggle-based (see, e.g., the headset 120 of FIG. 2).

As an example, the cushion 1332 may include transparent features. For example, consider a transparent extension or extensions that include a nose pad or nose pads, which may be transparent. As an example, the cushion 1332 may be made of a thin piece of material such that its interference with viewing is minimal.

As to the cushion 1334, it may be positionable at a distance above a browline (e.g., glabella), for example, consider a distance of at least 2 cm, at least 3 cm, etc. As an example, consider a cushion that can be utilized to support the headset 1300 on a user where the cushion is above a user's front gazing pupil position by about 5 cm such that a space exists for the user to look upwardly and view a portion of a multiply curved display of the headset 1300. As an example, a cushion may be positionable above the glabella and up to the hairline. As an example, a cushion may be positionable at or above the hairline.

Various head dimensions may be utilized in sizing, shaping, etc., a headset. As mentioned, the hairline and glabella may be utilized, other features can be the sellion (e.g., nasal root), the top of head, the eyes, the stomion, the face breadth (bzygomatic), head breadth, bitragion breadth, the menton-sellion distance, etc. For example, consider the menton-sellion distance as being from the tip of the chin to the nasal root, which may be in a range of approximately 10 cm to approximately 14 cm for an adult. The bitragion breadth may be from approximately 12 cm to approximately 16 cm for an adult. The sellion to top of head distance may be from approximately 3 cm to approximately 5.5 cm for an adult. As an example, a display of a headset may be dimensioned using one or more of the foregoing dimensions. For example, consider a curved display being at least 10 cm in length and at least 10 cm in width (e.g., noting that flat dimensions may be greater). Such a display may extend below a user's nose and above a user's eyes (e.g., above the sellion and to at least the forehead). As explained, cushions may be provided for below the nose and above the eyes (e.g., consider a chin cushion and a forehead cushion, etc.).

As an example, one or more of the cushions 1334 and 1338 may be adjustable, selectable, etc. For example, consider a kit where the kit includes cushions of various sizes and/or shapes. In such an example, a user may select a cushion or cushions to achieve a desired fit of the headset 1300. As an example, a cushion may be attachable and detachable using adhesive, hook and loop fasteners, etc. In such an example, a user may swap out a cushion for cleaning, replacement, to fit another user, etc. As an example, a cushion may be a pad that can contact a user's face to support a headset on a user. For example, a cushion can be a pad that is part of a head support system for supporting a headset on a user.

As an example, a cushion may include a fan such that the cushion is a support for the fan. As an example, a fan may be relatively small in size and supported by a cushion while the cushion may remain resilient. In the example of FIG. 13, the cushion 1338 is shown as optionally including one or more fans 1339, which may be actuated responsive to temperature, humidity, etc. For example, consider a temperature sensor, a humidity sensor, etc., that can provide a signal to circuitry that causes actuation of a fan or fans. In such an approach, heat generated by a user, by the headset, etc., may be dissipated and/or humidity (e.g., moisture) generated by a user may be dissipated. As an example, a fan or fans may be part of an anti-fogging mechanism of a headset that aims to reduce formation of condensation on a display and/or a user's face (e.g., eyelashes, etc.).

As an example, a display may be operated to maintain a particular temperature such that condensation on the display is minimized. For example, where condensation may occur (e.g., as indicated by one or more sensors, etc.), an operational temperature of a display may be increased (e.g., via resistance, increase in current, etc.) to raise the temperature above that at which condensation forms. In such an example, the display can be an anti-condensation display. Such an approach can be helpful where a user's nose and mouth are covered by a headset.

As an example, a headset can include one or more anti-fogging or anti-condensation mechanisms, which may provide for clearer viewing of a display and/or user comfort.

Figure 14:
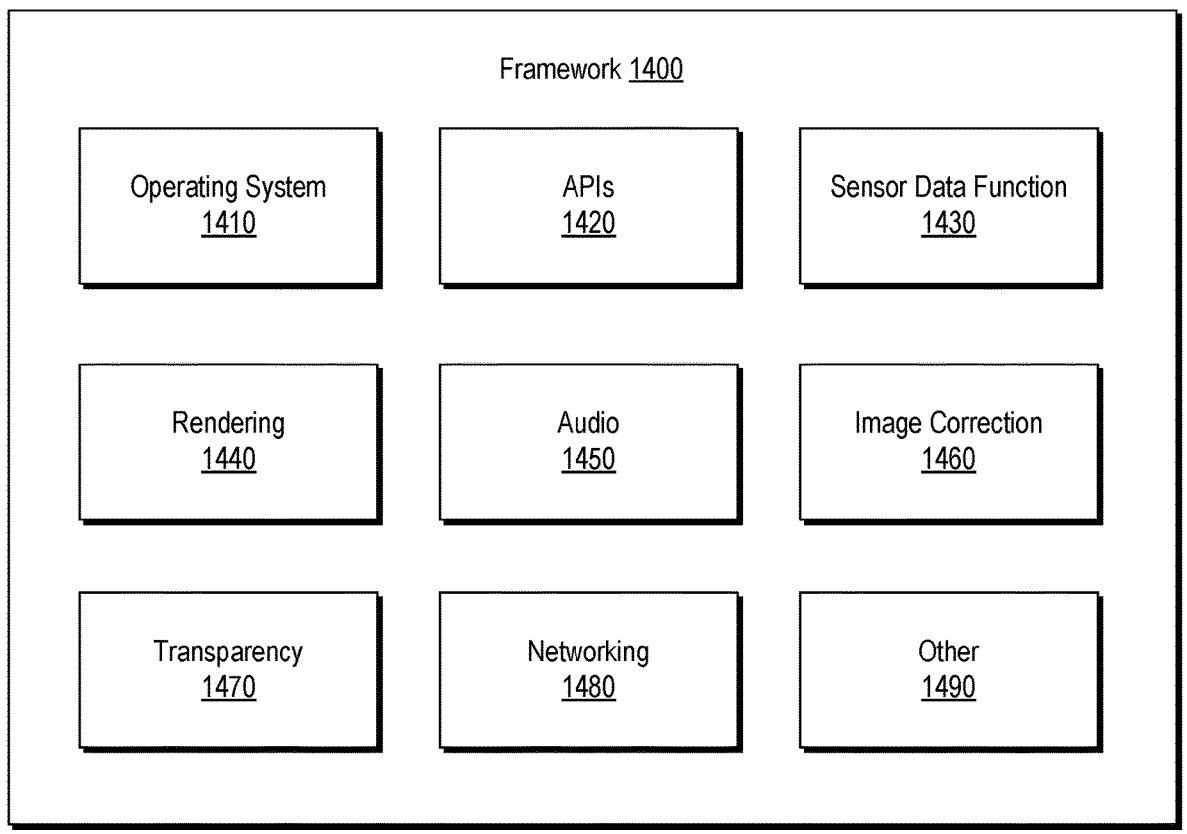
FIG. 14 is a diagram of examples of framework features.

FIG. 14 shows examples of features of a framework 1400, which may be part of a software development kit (SDK). As shown, the framework 1400 can include operation system features 1410, application programming interface (API) features 1420, sensor data function features 1430, rendering features 1440, audio features 1450, image correction features 1460, transparency features 1470, networking features 1480 and one or more other features 1490. As explained, a headset such as the headset 200 can provide for an enhanced user experience when compared to a goggle-based headset. Such enhancements may be programmable via a framework, which can include developer components and headset components. For example, a developer may utilized features of the framework 1400 to provide renderable content, which may make use of a larger field of view, particularly in a lower half of a headset; noting that view may be extended to the sides and above as well. As mentioned, a headset may be suitable for stereoscopic imagery, for example, using an active shutter and/or one or more other techniques. As an example, the framework 1400 may provide for generation of such imagery, shutter signals, etc.

As explained, a headset such as the headset 200 can provide for rendering of visualizations that do not demand as much head movement when compared to the headset 120 of FIG. 2. For example, the user 101 may maintain a relatively constant head position while being able to see an object or objects approaching from the periphery, whether side periphery, upper periphery or lower periphery. With less head movement, a user may be more comfortable and experience less ear/balance related issues. For example, where head movement is less, the user's ears move less, which means that the user's balance mechanisms are not constantly being challenged due to head movement.

Individual differences exist in susceptibility to getting VR sickness. For example, women tend to be more susceptible than men to experience nausea in VR, which could be due to one or more reasons, which may include women having a wider field of view than men or differences in depth cue recognition. Age may also be a factor, where adults aged 50 and above may be more susceptible to VR sickness than younger users. Some recommend that a user be seated when using VR goggles to naturally restrict body movement, which can reduce risk of being disorientated. While sitting may help, the balance mechanisms of the ears are not so constrained. However, where a headset such as the headset 200 provides a more natural field of view, head movements may be reduced and a user may have a more natural user experience, which can help to reduce risk of VR sickness.

As an example, a headset can include a head mount; a support coupled to the head mount; and a multiply curved display coupled to the support. In such an example, the multiply curved display can include a long axis and a short axis. For example, consider a long axis that is a vertical axis and a short axis that is a horizontal axis. As an example, a multiply curved display can be a bendable display.

As an example, a multiply curved display can include panels. In such an example, the panels can include folding panels and/or nesting panels.

As an example, a headset can include circuitry, for example, where the circuitry includes field of view control circuitry that can set an active extent of a multiply curved display of the headset. As an example, circuitry of a headset can include distortion control circuitry. For example, consider distortion control circuitry that provides pin-cushion distortion control, barrel distortion control and mustache distortion control.

As an example, a headset can include memory and at least one processor operatively coupled to the multiply curved display for rendering of content to the multiply curved display.

As an example, a headset can include anti-condensation circuitry. As an example, a headset can include a fan. As an example, anti-condensation circuitry can include circuitry for one or more of temperature control and humidity control. As an example, a headset may include one or more temperature sensors, humidity sensors, etc.

As an example, a headset can include one or more nose pads, etc. As an example, a multiply curved display of a headset can extend below a nose pad. As an example, a headset can include at least one head cushion positionable proximate to a hairline of a user. As an example, a head cushion can be positioned between the glabella (the smooth part of the forehead above and between the eyebrows) of a user and a hairline of the user (e.g., the anatomic hairline prior to any loss). In such an example, the head cushion may be positionable closer to the hairline than the glabella. As an example, the glabella can define a browline. An anatomical depth of a face can be the spacing between the hairline and the glabella or browline. As an example, a low hairline (from browline to hairline) may span between approximately 5 cm to approximately 8 cm (e.g., depending on gender), a medium hairline may range from approximately 8 cm to approximately 11.6 cm and a high hairline can exceed approximately 11.6 cm.

In such an example, a clearance can exist between an upper portion of a user's eye sockets and the head cushion, which may be at least 4 cm. In such an example, a viewable portion of a multiply curved display can be viewable by a user particularly when the user gazes upwardly. As an example, a headset can include at least one head cushion positionable closer to a hairline than a browline. As an example, a headset can include at least one chin cushion. As an example, a chin cushion can be a mount for a fan or fans.

As an example, a headset can include at least one head strap coupled to the support.

As an example, a headset can include a multiply curved display that has adjustable curvature and adjustable eye-to-display distance.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium. As an example, a computer-readable medium may be a computer-readable medium that is not a carrier wave.

Figure 15:
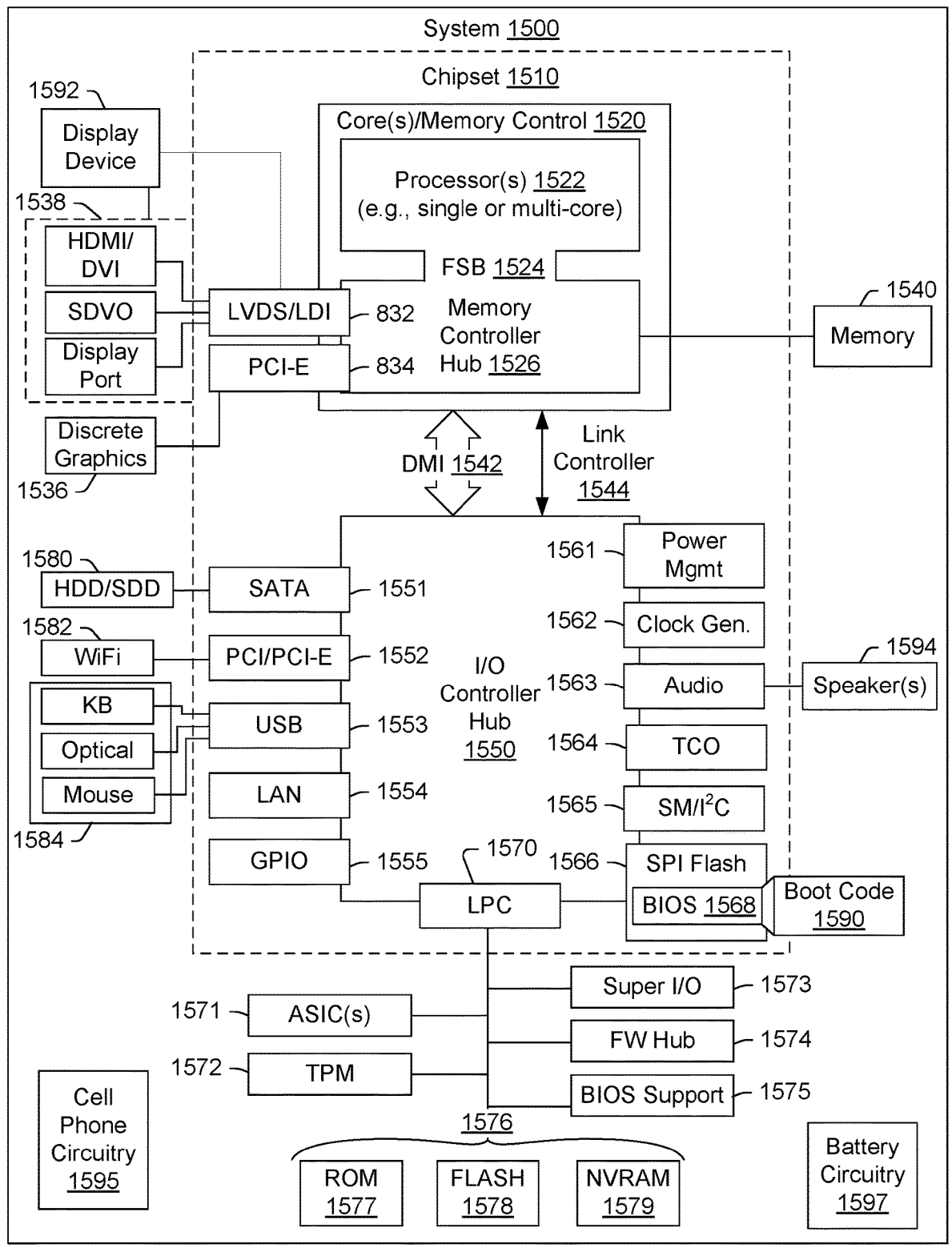
FIG. 15 is a diagram of an example of a system that includes one or more processors.

While various examples of circuits or circuitry have been discussed, FIG. 15 depicts a block diagram of an illustrative computer system 1500. The system 1500 may be a desktop computer system, such as one of the THINKCENTRE® or THINKPAD® series of personal computers sold by Lenovo (US) Inc. of Morrisville, N.C., or a workstation computer, such as the THINKSTATION®, which are sold by Lenovo (US) Inc. of Morrisville, N.C.; however, as apparent from the description herein, a satellite, a base, a server or other machine may include other features or only some of the features of the system 1500. As described herein, a device, such as, for example, the device 200, may include at least some of the features of the system 1500. As an example, a power unit, such as, for example, the power unit 300, may include one or more features of the system 1500.

As shown in FIG. 15, the system 1500 includes a so-called chipset 1510. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 15, the chipset 1510 has a particular architecture, which may vary to some extent depending on brand or manufacturer. The architecture of the chipset 1510 includes a core and memory control group 1520 and an I/O controller hub 1550 that exchange information (e.g., data, signals, commands, etc.) via, for example, a direct management interface or direct media interface (DMI) 1542 or a link controller 1544. In the example of FIG. 15, the DMI 1542 is a chip-to-chip interface (sometimes referred to as being a link between a "northbridge" and a "southbridge").

The core and memory control group 1520 include one or more processors 1522 (e.g., single core or multi-core) and a memory controller hub 1526 that exchange information via a front side bus (FSB) 1524. As described herein, various components of the core and memory control group 1520 may be integrated onto a single processor die, for example, to make a chip that supplants the conventional "northbridge" style architecture.

The memory controller hub 1526 interfaces with memory 1540. For example, the memory controller hub 1526 may provide support for DDR SDRAM memory (e.g., DDR, DDR2, DDR3, etc.). In general, the memory 1540 is a type of random-access memory (RAM). It is often referred to as "system memory".

The memory controller hub 1526 further includes a low-voltage differential signaling interface (LVDS) 1532. The LVDS 1532 may be a so-called LVDS Display Interface (LDI) for support of a display device 1592 (e.g., a CRT, a flat panel, a projector, etc.). A block 1538 includes some examples of technologies that may be supported via the LVDS interface 1532 (e.g., serial digital video, HDMI/DVI, display port). The memory controller hub 1526 also includes one or more PCI-express interfaces (PCI-E) 1534, for example, for support of discrete graphics 1536. Discrete graphics using a PCI-E interface has become an alternative approach to an accelerated graphics port (AGP). For example, the memory controller hub 1526 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1550 includes a variety of interfaces. The example of FIG. 15 includes a SATA interface 1551, one or more PCI-E interfaces 1552 (optionally one or more legacy PCI interfaces), one or more USB interfaces 1553, a LAN interface 1554 (more generally a network interface), a general purpose I/O interface (GPIO) 1555, a low-pin count (LPC) interface 1570, a power management interface 1561, a clock generator interface 1562, an audio interface 1563 (e.g., for speakers 1594), a total cost of operation (TCO) interface 1564, a system management bus interface (e.g., a multi-master serial computer bus interface) 1565, and a serial peripheral flash memory/controller interface (SPI Flash) 1566, which, in the example of FIG. 15, includes BIOS 1568 and boot code 1590. With respect to network connections, the I/O hub controller 1550 may include integrated gigabit Ethernet controller lines multiplexed with a PCI-E interface port. Other network features may operate independent of a PCI-E interface.

The interfaces of the I/O hub controller 1550 provide for communication with various devices, networks, etc. For example, the SATA interface 1551 provides for reading, writing or reading and writing information on one or more drives 1580 such as HDDs, SDDs or a combination thereof. The I/O hub controller 1550 may also include an advanced host controller interface (AHCI) to support one or more drives 1580. The PCI-E interface 1552 allows for wireless connections 1582 to devices, networks, etc. The USB interface 1553 provides for input devices 1584 such as keyboards (KB), one or more optical sensors, mice and various other devices (e.g., microphones, cameras, phones, storage, media players, etc.). On or more other types of sensors may optionally rely on the USB interface 1553 or another interface (e.g., I²C, etc.). As to microphones, the system 1500 of FIG. 15 may include hardware (e.g., audio card) appropriately configured for receipt of sound (e.g., user voice, ambient sound, etc.).

In the example of FIG. 15, the LPC interface 1570 provides for use of one or more ASICs 1571, a trusted platform module (TPM) 1572, a super I/O 1573, a firmware hub 1574, BIOS support 1575 as well as various types of memory 1576 such as ROM 1577, Flash 1578, and non-volatile RAM (NVRAM) 1579. With respect to the TPM 1572, this module may be in the form of a chip that can be used to authenticate software and hardware devices. For example, a TPM may be capable of performing platform authentication and may be used to verify that a system seeking access is the expected system.

The system 1500, upon power on, may be configured to execute boot code 1590 for the BIOS 1568, as stored within the SPI Flash 1566, and thereafter processes data under the control of one or more operating systems and application software (e.g., stored in system memory 1540). An operating system may be stored in any of a variety of locations and accessed, for example, according to instructions of the BIOS 1568. Again, as described herein, a satellite, a base, a server or other machine may include fewer or more features than shown in the system 1500 of FIG. 15. Further, the system 1500 of FIG. 15 is shown as optionally include cell phone circuitry 1595, which may include GSM, CDMA, etc., types of circuitry configured for coordinated operation with one or more of the other features of the system 1500. Also shown in FIG. 15 is battery circuitry 1597, which may provide one or more battery, power, etc., associated features (e.g., optionally to instruct one or more other components of the system 1500). As an example, a SMBus may be operable via a LPC (see, e.g., the LPC interface 1570), via an I²C interface (see, e.g., the SM/I²C interface 1565), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A headset comprising:
a head mount;
a support coupled to the head mount;
a multiply curved display coupled to the support, wherein the multiply curved display comprises a horizontal curvature and a vertical curvature, a sellion point, and a length of at least 10 cm that extends in part above the sellion point and in part below the sellion point; and
circuitry that comprises field of view control circuitry that sets an active extent of the multiply curved display.

2. The headset of claim 1, wherein the multiply curved display is a bendable display.

3. The headset of claim 1, wherein the multiply curved display comprises panels.

4. The headset of claim 3, wherein the panels comprise folding panels.

5. The headset of claim 1, wherein the circuitry comprises distortion control circuitry.

6. The headset of claim 5, wherein the distortion control circuitry provides for at least one of pin-cushion distortion control, barrel distortion control and mustache distortion control.

7. The headset of claim 1, comprising memory and at least one processor operatively coupled to the multiply curved display for rendering of content to the multiply curved display.

8. The headset of claim 1, comprising anti-condensation circuitry.

9. The headset of claim 1, comprising a fan.

10. The headset of claim 1, comprising at least one nose pad.

11. The headset of claim 10, wherein the multiply curved display extends a distance above and a distance below the at least one nose pad.

12. The headset of claim 1, comprising at least one head cushion positionable closer to a hairline than a browline.

13. The headset of claim 1, comprising at least one chin cushion.

14. The headset of claim 1, comprising at least one head strap coupled to the support.

15. The headset of claim 1, wherein the multiply curved display comprises adjustable curvature and adjustable eye-to-display distance.

16. The headset of claim 1, wherein the horizontal curvature and the vertical curvature generate a Gaussian curvature that does not exceed a strain limit of the display.

17. A headset comprising:
a head mount;
a support coupled to the head mount; and
a multiply curved display coupled to the support, wherein the multiply curved display comprises panels, wherein the panels comprise nesting panels, and wherein the nesting panels are shaped as lemon portions.

18. The headset of claim 17, wherein the lemon portions comprise one or more truncated lemon portions.

19. A headset comprising:
a head mount;
a support coupled to the head mount; and
a multiply curved display coupled to the support, wherein the multiply curved display comprises a horizontal curvature and a vertical curvature, a sellion point, and a length of at least 10 cm that extends in part above the sellion point and in part below the sellion point, and wherein the multiply curved display comprises adjustable curvature and adjustable eye-to-display distance.

20. The headset of claim 19, wherein the multiply curved display is a bendable display.

21. The headset of claim 19, wherein the multiply curved display comprises panels.

22. The headset of claim 21, wherein the panels comprise folding panels.

\* \* \* \* \*